US006553494B1

(12) United States Patent
Glass

(10) Patent No.: US 6,553,494 B1
(45) Date of Patent: Apr. 22, 2003

(54) METHOD AND APPARATUS FOR APPLYING AND VERIFYING A BIOMETRIC-BASED DIGITAL SIGNATURE TO AN ELECTRONIC DOCUMENT

(75) Inventor: Randal Glass, Hockessin, DE (US)

(73) Assignee: Sensar, Inc., Moorestown, NJ (US)

( * ) Notice: Subject to any disclaimer, the term of this patent is extended or adjusted under 35 U.S.C. 154(b) by 0 days.

(21) Appl. No.: 09/358,593

(22) Filed: Jul. 21, 1999

(51) Int. Cl.⁷ .............................................. H04L 9/32
(52) U.S. Cl. ..................... 713/186; 713/176; 713/185
(58) Field of Search ................. 713/176, 185, 713/186

(56) References Cited

U.S. PATENT DOCUMENTS

| | | | |
|---|---|---|---|
| 4,202,626 A | 5/1980 | Mayer, Jr. et al. | 355/52 |
| 4,641,349 A | 2/1987 | Flom et al. | 382/2 |
| 4,876,608 A | 10/1989 | Eaton | 358/443 |
| 5,091,938 A | 2/1992 | Thompson et al. | 380/21 |
| 5,151,583 A | 9/1992 | Tokunaga et al. | 250/201.2 |
| 5,291,560 A | 3/1994 | Daugman | 382/2 |
| 5,404,163 A | 4/1995 | Kubo | 348/142 |
| 5,544,255 A | 8/1996 | Smithies et al. | 382/119 |
| 5,572,596 A | 11/1996 | Wildes et al. | 382/117 |
| 5,598,474 A | 1/1997 | Johnson | 380/23 |
| 5,644,655 A | 7/1997 | Windsor | 382/209 |
| 5,647,017 A | 7/1997 | Smithies et al. | 382/114 |
| 5,719,950 A | 2/1998 | Osten et al. | 382/115 |
| 5,818,955 A | 10/1998 | Smithies et al. | 382/115 |
| 5,872,848 A * | 2/1999 | Romney et al. | 705/76 |
| 6,401,206 B1 * | 6/2002 | Khan et al. | 713/176 |

FOREIGN PATENT DOCUMENTS

| | | | |
|---|---|---|---|
| EP | 0 859 488 A2 | 8/1998 | H04L/9/32 |
| EP | 0 863 491 A1 | 9/1998 | G07L/9/00 |
| WO | WO 98/12661 | 3/1998 | G06K/9/00 |
| WO | WO 98/39876 A1 | 9/1998 | H04L/9/00 |
| WO | WO 99/11021 | 3/1999 | H04L/9/00 |
| WO | WO 99/52060 | 10/1999 | G06K/9/00 |

OTHER PUBLICATIONS

Schneier, B., "Applied Cryptography," 1996, John Wiley and sons, USA, XP002155112; ISBN:0–471–12845–7, pp. 38–40.

IriScan, Inc., Webpage, printed from the internet on Aug. 6, 1999, 25 pages.

Sensar, Inc., Webpage, printed from the internet on Aug. 10, 1999, 6 pages.

John Dougman, Webpage, Cambridge University, Computer Laboratory, Cambridge, UK, printed from the internet on Sep. 27, 28 and 29, 1999, 34 pages.

PenOp Webpage, printed from the internet on Aug. 6, 1999, 13 pages.

* cited by examiner

*Primary Examiner*—Justin Darrow
(74) *Attorney, Agent, or Firm*—Woodcock Washburn LLP

(57) ABSTRACT

A method and apparatus are disclosed whereby a person signs an electronic document using a personal biometric. A sample of biometric data is collected from the person at the time of the signing of the document, and encrypted with the document itself and various other data to form a digital signature. The encryption technique utilized irrefutably couples the biometric data with the document. To authenticate the coupling, an authenticator signature is generated using the original data and is then compared with the original signature to verify a match there between. The biometric data used to generate the authenticator signature is then matched with a sample provided by an alleged signer of the document to verify his or her identity.

34 Claims, 4 Drawing Sheets

METHOD AND APPARATUS FOR APPLYING AND VERIFYING A BIOMETRIC-BASED DIGITAL SIGNATURE TO AN ELECTRONIC DOCUMENT

BACKGROUND

Paper documents with a penned signature are given much consideration as proof that an individual created, viewed, approved, or agreed to the material contained in the document. Specifically, the act of signing a document binds an individual to the document in some manner. For example, parties signify their agreement to the terms of a contract when the contract is signed. Often, a Notary Public is present in order to guarantee the identity of the individual(s) signing the document. The Notary Public attests to the identity of the signers by applying an unalterable seal to the document. It is desirable to implement a similar process for electronic documents; that is, to perform some processing on an electronic document that binds an individual to a particular document in such a manner that the individual can be identified, the document can be verified, and that it is provable at any later point in time that the individual and document were coupled.

An electronic document may be defined as any arbitrary sequence of digital data which is fixed at some time. In this context, the document could be the results of a word processor (e.g. the text of a legal contract,) a spreadsheet, a database file, a digital image taken by a digital camera, or even source or object computer codes. This could even be a short lived electronic document such as a transaction to/from a web page.

Current digital signature techniques that are used to bind an individual to an electronic document rely on a key or keys presumably known only to the signer or possessed only by the signer (e.g. keys stored on a smart card) of the document. Unfortunately, this approach is not as secure as it may appear, since if the knowledge or possession of the key can be obtained by another individual, either with or without the consent or knowledge of the original individual, then doubt may exist as to the true identity of the signer. So a fundamental problem with acceptance of digital signatures is the fact that someone could compromise their integrity by repudiating their "signature." For example, a person could sign a document, and then claim that their secret key had been compromised, and thus introduce doubt as to the actual signer of the document. Thus there is a need for a more secure method of performing digital signing. The incorporation of a highly robust biometric solves this problem, since the signing of the document is not performed with something that the individual knows or has, but rather something that the individual "is." Additionally it would be significantly difficult to almost impossible for someone to duplicate the biometric portion of the signature. Robust biometric techniques such as iris identification, coupled with cryptographic techniques such as digital signatures may be employed to provide a secure solution. Such a system is described herein.

Algorithms such as hash functions have long been used as a means of authenticating that a given electronic document has not been altered. The output of a hash function operating on a block of data, such as an electronic document, is a smaller block of data that is characteristic of the input data such that given the same input data, reapplication of the same hash function will compute the same output. Thus the hash reduces the dimensionality of the original document to one that is smaller but is a function of all the data in the original document. This data block can be thought of as the "digital fingerprint" of the input data. Any change in the input elements will result in a change of the output data block. A checksum is a example of a simple hash function. A good or robust hash algorithm will produce hash values that are very different even if very small changes to the document's contents are made. Robust hash algorithms have the additional property that, given a hash value, it is extraordinarily difficult to create a document or alter an existing one that produces the same hash value as the known one. Thus, an attacker could not feasibly generate a fraudulent document with the same hash value as the original document he or she is trying to replace. In this sense, a checksum is not considered to be a good hash function, whereas algorithms such as MD5, or SHA are considered to be examples of "good" functions An explanation of MD5, SHA, and other hash functions may be found in "Applied Cryptography" by Bruce Schneier.

As an example, in an electronic mail scenario, a sender would compute the hash value of the document he or she wishes to send, and send that hash value along with the document. The recipient could determine that the document had not been altered by computing the hash value of the document with the same algorithm, and then would compare the output of this hash computation with the hash value sent with the document. If the values are the same, it is extremely unlikely that the document has been altered.

A hash algorithm may also use a token as part of its input. This token could be combined with the document data in an operation such as concatenation. The token may provide a time stamp or other unique identifier to the hash. For example, with this approach, anyone wishing to sign a document might request a unique token from a central token server. The server would return a unique token while recording the token, time, and date and perhaps other information for use when the document must be authenticated.

By combining unique tokens with identical documents, different hash values for the same document can be obtained and individual transactions involving the document can be identified. The token must be provided at the time the document is to be authenticated, since the correct hash value now depends on both the document and the token. The token may be supplied by a service similar to a certification authority.

Additional security may be implemented by including a secret key in the process, for example, by encrypting the hash algorithm output with a cryptographic key. A hash which has been encrypted with a key, is commonly known as a "digital signature". The notable difference between a hash function and a digital signature is the inclusion of a "secret" in the latter; a hash algorithm may be well known (and even the token may be known). Therefore anyone can compute a value for a given document, but with the addition of this "secret", only parties with knowledge of the key can perform signing and authentication. In general the encryption described can be either symmetric or asymmetric. For the context of this patent, in symmetric encryption, the same key is used for encryption of the data and for decryption of the data, while in asymmetric encryption a private key is used to encrypt the data but a public key is used for decryption. Knowledge of the public key only allows decryption; it cannot be used to encrypt and it cannot be decoded to determine the secret private key.

A digital signature may be generated by encrypting the output of a hash algorithm whose inputs are the original data, and a token, as described above. The encryption is performed with a secret key, usually called a "private key". Therefore, the "binding" of an individual to the document is based on the assumption that the "private key" is secret, and known only to the originating party and no one else. Verification of the binding can be accomplished by the recipient using the originator's public key to decrypt the hash value sent with the document in order to compare it to the hash value computed by the recipient. A match proves that the document was not altered and that the sender was the holder of the private key. The public key is distributed as necessary by the originator as it can only be used to authenticate, but not to sign. Therefore, any recipient may safely have possession of the public key. However, as noted previously, if the private key is compromised, any person with knowledge of the private key can "sign" documents as if they were the same person as the true owner of the private key.

Up to this point, no biometrics have been included and the security of the digital signature is only as secure as the maintenance of tokens and keys. By including biometric data with other inputs to a hash function prior to encryption, one can bind the signer's identity to a document in a very secure fashion since there cannot be a sharing or compromise of "secret" biometric information that can form the basis of repudiation.

SUMMARY OF THE INVENTION

I provide a method and apparatus which couples the biometric data from the signer of an electronic document with the electronic document. An optional one-time token is generated or requested from a central token server. The one-time token may serve as a time stamp to the document. This token is then combined with the document to be signed, and a hash value of the combination is computed by applying a hash function. In order to complete the signature of the document, the signer supplies his or her biometric information. The digital signature is generated using a signature function, most likely involving an asymmetric encryption function and a hash function utilizing as inputs the signer's biometric data, and the already performed hash of the document (or document-token combination if tokens are used). A private key is needed to perform the actual encryption. This key must remain a secret or the security of the system may be compromised, since with knowledge of the key an attacker could sign arbitrary data. The private key may be embedded into the biometric apparatus and also serve to uniquely identify the apparatus. Without the use of a secret key, an attacker could insert a "replacement" image of an eye that was fraudulently obtained.

To authenticate the digital signature of the document, the authenticator will require the original document, the one-time token (if used), the biometric data of the signer, and the secret key. If an asymmetric encryption function was used, the secret key is replaced by the public complement of the secret key (the "public key"). First, a hash value is computed with the document, token and biometric data in the same manner as performed by the signer. The digital signature sent with biometric data is decrypted with the key; this returns the hash computed by the signer. If the value of the newly computed hash matches the value of the hash sent by the signer, then it is proved that neither the biometric data nor the document have been altered, and the coupling of the biometric data and the document has been verified. To further verify the identity of the signer, it will be necessary to match the biometric data with a known sample from the signer, utilizing any method known in the art. One such method which performs iris identification is described in U.S. Pat. No. 5,291,560 to Daugman. Other methods of encryption to preserve the security of the system such that some type of secret information is needed to perform the signing (and to perform the authentication) and other biometrics are known in the art, and may be used in lieu of the method just described.

DETAILED DESCRIPTION OF THE INVENTION

Figure 1:
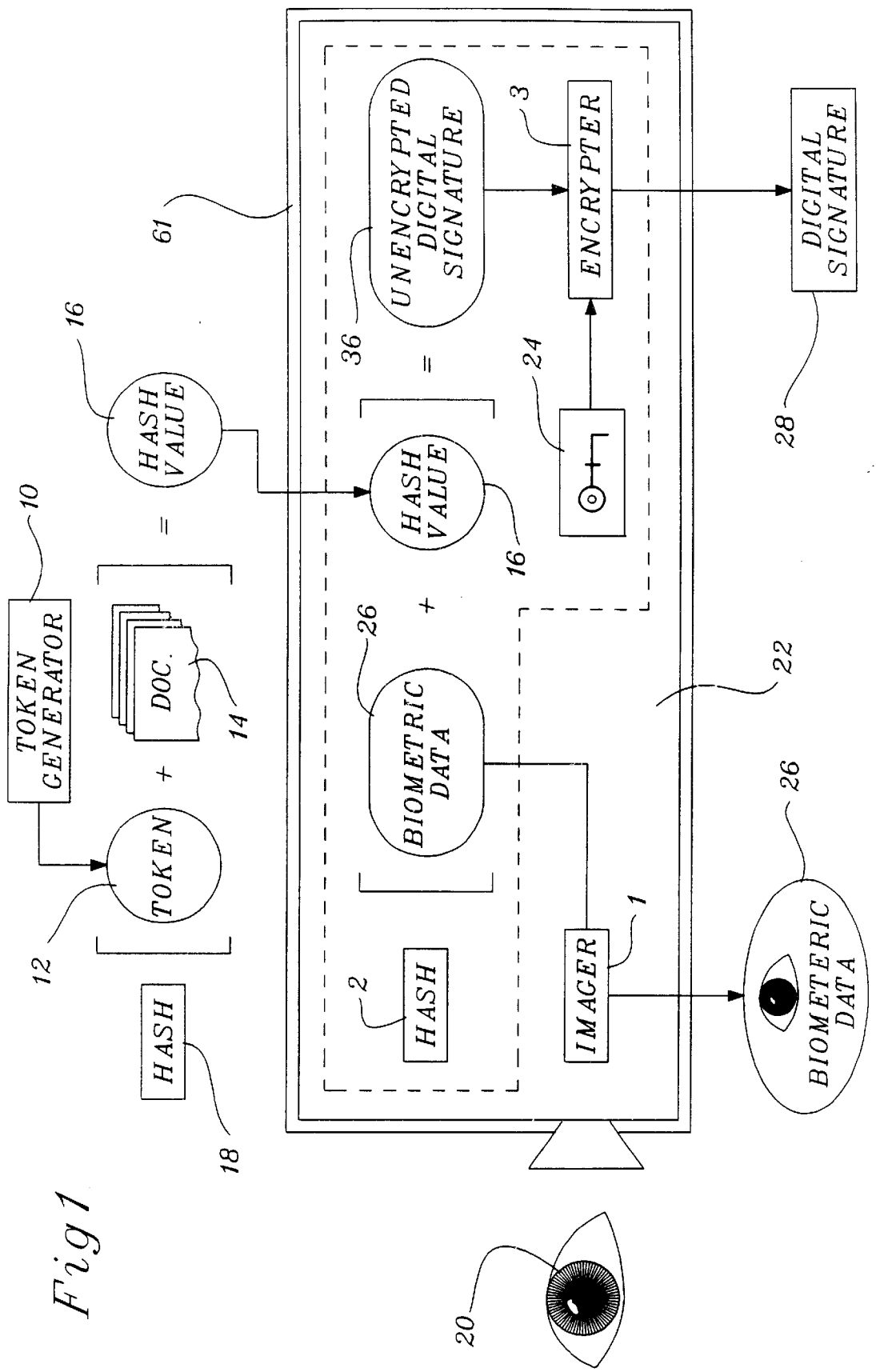
FIG. 1 is a schematic diagram of the document signing process in accordance with a present preferred embodiment of the invention.

The preferred embodiment by which an electronic document is signed is shown schematically in FIG. 1. A token 12 is generated by token generator or server 10, which may be a located locally or remotely accessible over a network. Token 12 is combined with electronic document 14 by an operation, such as simple concatenation. Hash function 18 is executed on the combination of token 12 and document 14, yielding hash value 16. Hash value 16 will therefore be based on the combination of document 14 and unique token 12. This operation may be useful if a binding of the document and a single transaction are desired, since each application of hash function 18, or each "transaction" will have a unique token 12 associated with it.

The preferred embodiment of the invention utilizes the iris of the eye of the signer of the document as the biometric, although any biometric that is capable of uniquely identifying the signer may be used. Examples of other such biometrics include fingerprints, hand prints and retina scans. To use the iris as the biometric, the iris of the signer's eye, 20 is scanned by camera 22. Associated with camera 22 is secret key 24, which is capable of uniquely identifying camera 22. Key 24 must remain secret so that an attacker could not produce signatures using fraudulent data. Key 24 may be the private key of an asymmetric encryption scheme.

Camera 22 accepts as input a unique token, which is combined with the biometric data such that the biometric data cannot be re-used nor substituted for another image. The computed hash value 16 of document 14 may be entered into camera 22 in lieu of a token received directly from a token server.

Camera 22 consists of an imager 1 which acquires the image of the user's eye, 20. This data can then be output directly to a secondary processor, not shown, for quality checking if desired. Alternatively imager 1 can send the data to the signature module, 4 in which processor 2 hashes the combination of the biometric data, 26 with hash value 16 to form unencrypted digital signature 36. Encrypted digital signature 28 is the output of encryptor, 3, which uses secret key, 24 to encrypt unencrypted digital signature 36.

Camera 22 is preferably secured by tamper-proof housing 61. Housing 61 can be constructed such that any attempt to gain access to the camera would cause its ultimate destruction. Alternatively, housing 61 may include one or more tamper detectors that will signal the control logic of camera 22 to enter a non-functioning state or to delete software routines used to generate the digital signature and/or the camera's secret key 24 when an attempt at entry is detected. Without such a "security envelope," an attacker may be able to alter or substitute images within camera 22, or an attacker might gain access to the security features (such as access to secret key 24) which could allow the attacker to produce digital signatures of fraudulent data.

The camera returns digital signature 28, along with biometric data, 26, to be stored for later use in authentication. As noted earlier, digital signature 28 may be computed using any method known to those skilled in the art. Preferably, the encryption method used in the digital signature function would be asymmetric; thereby allowing secret key 24 to remain secret, while a complementary public key is used when signature 28 is authenticated.

Camera 22 is employed to obtain the raw images of the biometric feature in question, such as an image of the iris of an eye. Camera 22 may have the additional capability of internally producing a biometric template, such as the one described by Daugman in U.S. Pat. No. 5,291,560, from the raw biometric data it obtains. In such a case, camera 22 will include additional hardware and software which will allow it to produce not only an image of a person's iris, but also an encoding of the iris into data suitable for biometric matching. This would eliminate the need for the conversion of the raw image to the biometric template on some other device, and would require less data transfer overhead (for example, only 512 bytes for an iris template would need to be transferred from the camera versus 640×480 bytes for an iris image.)

Part of the process of camera 22 acquiring biometric data 26 may include sending candidate images to an algorithm resident on a PC to verify the quality of the image before it is stored and used as input to the hash function. The quality checks include making sure the image is in focus, the iris is of the proper size and the eye (and iris) are approximately centered in the image. Those images that meet these criteria are called "iris quality images". Camera 22 may take images of either or both eyes of the individual signing the document. In fact, biometric data 26 could contain images of both eyes of the document signer.

It is also possible that camera 22 includes hardware and software so that it can compute hash value 16 of document 14 internally. This process would require the ability for the camera to accept the "downloading" or "streaming" of document 14. While document 14 downloads into camera 22, camera 22 would compute hash value 16 of document 14 then use the final hash result in the generation of the signature as before. This would eliminate the step of document hashing on a separate computer, but may be a slower process due to extra data communications.

Thus, there is a logical "chain" of bindings which occur and which can be proven by authentication. First, a single transaction may be bound to a unique token by a token generating scheme. Next, the token may be bound to the document by combining the two and then hashing. Then, the token, document, and biometric data may be bound by combining the hash of the first two with the image produced by the camera, and then performing the digital signature on that result using the camera's secret key to produce the final result, 28. If the secret key, 24, is unique to each camera, 22, a binding to the camera that produced the image is also created. The final binding is the biometric data to the individual, which is performed by a biometric system. The authentication process will be able to show that no bindings in this chain has been broken, and therefore that some person "signed" some document with some camera during the time of some transaction.

Figure 2:
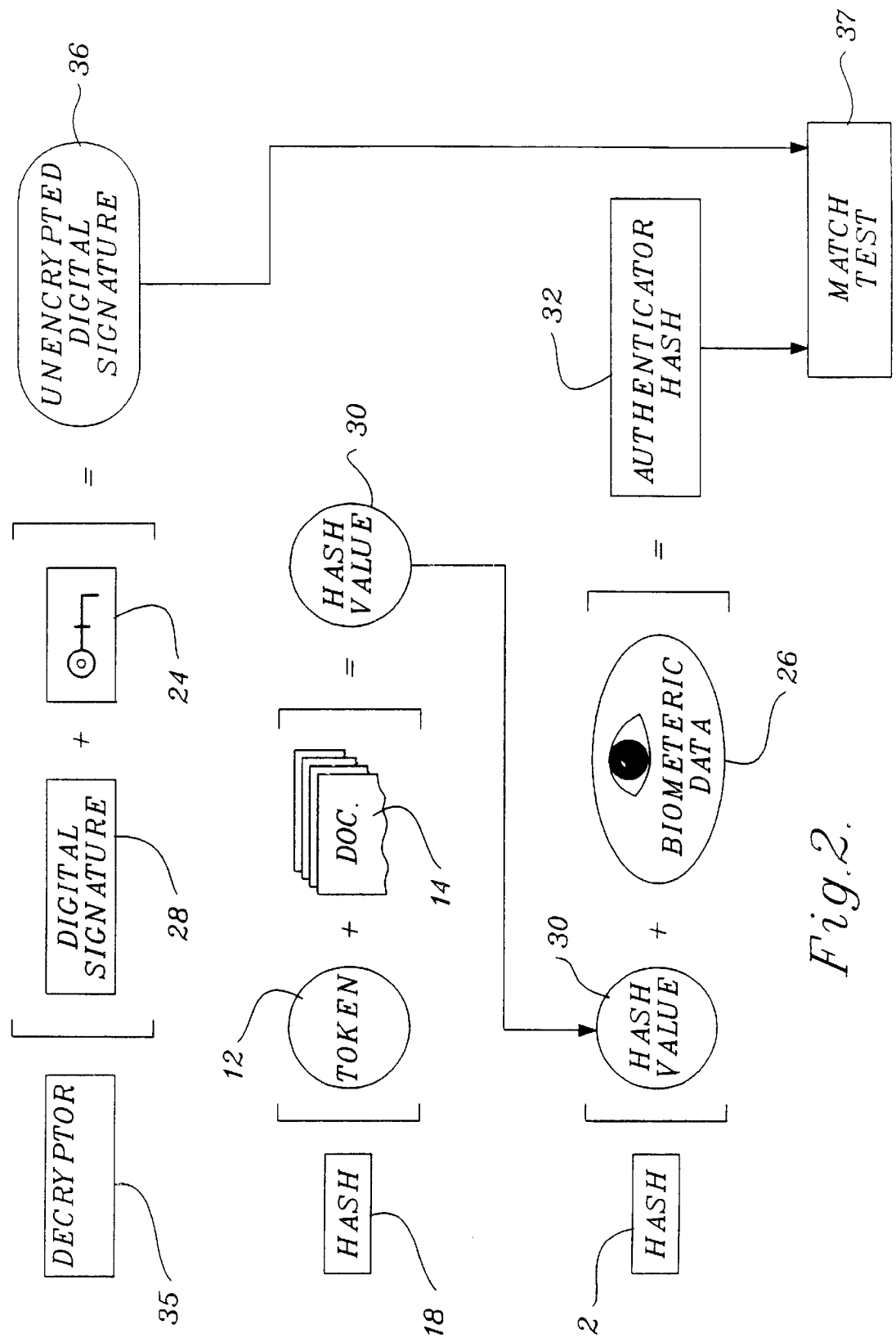
FIG. 2 is a schematic diagram of the authentication process for authenticating the signature on an electronic document signed using the process shown in FIG. 1.

The authentication process of the preferred embodiment is shown in FIG. 2. To perform the authentication, it is necessary to have access to original document 14, token 12, biometric data 26, secret key 24 (or, if an asymmetric encryption algorithm is being used, the public complement of secret key 24) and digital signature 28. There are three parts to the authentication process, the first part is unencryption of the supplied digital signature 28, the second part, computation of the hash corresponding to the data provided, and the third part is comparison of the results of part one and part two.

In part one, the authenticator must perform the decryption of signature 28 in order to yield unencrypted signature 36. This is accomplished by decryptor 35. To do this, secret key 24, (or if an asymmetric scheme is used the public compliment of 24) is used.

In part two, token 12 is combined with document 14, and hash function 18 is applied to the result, yielding hash value 30. Hash value 30 is then combined with biometric data 26 and then hashed using function 2. This yields authenticator hash 32.

In part three, the unencrypted signature 36 is matched with authenticator hash 32 by block X6. If the result is a match, then the following information is known:

1. The document (and optional token) used in calculating authenticator hash 32 is identical to the document (and token) used to calculate signature 28; and
2. The biometric data used in calculating authenticator hash 32 is identical to the biometric data used to calculate signature 28.

Therefore, the biometric data has been coupled with the document; and the biometric data can be used to verify the identity of the individual using a biometric verification process.

If either the document or image have been altered in any way, authenticator hash 32 will not match unencrypted digital signature 36 that was computed from digital signature 28 originally sent along with the biometric data, and thus the chain of bindings is proved to be broken.

Figure 3:
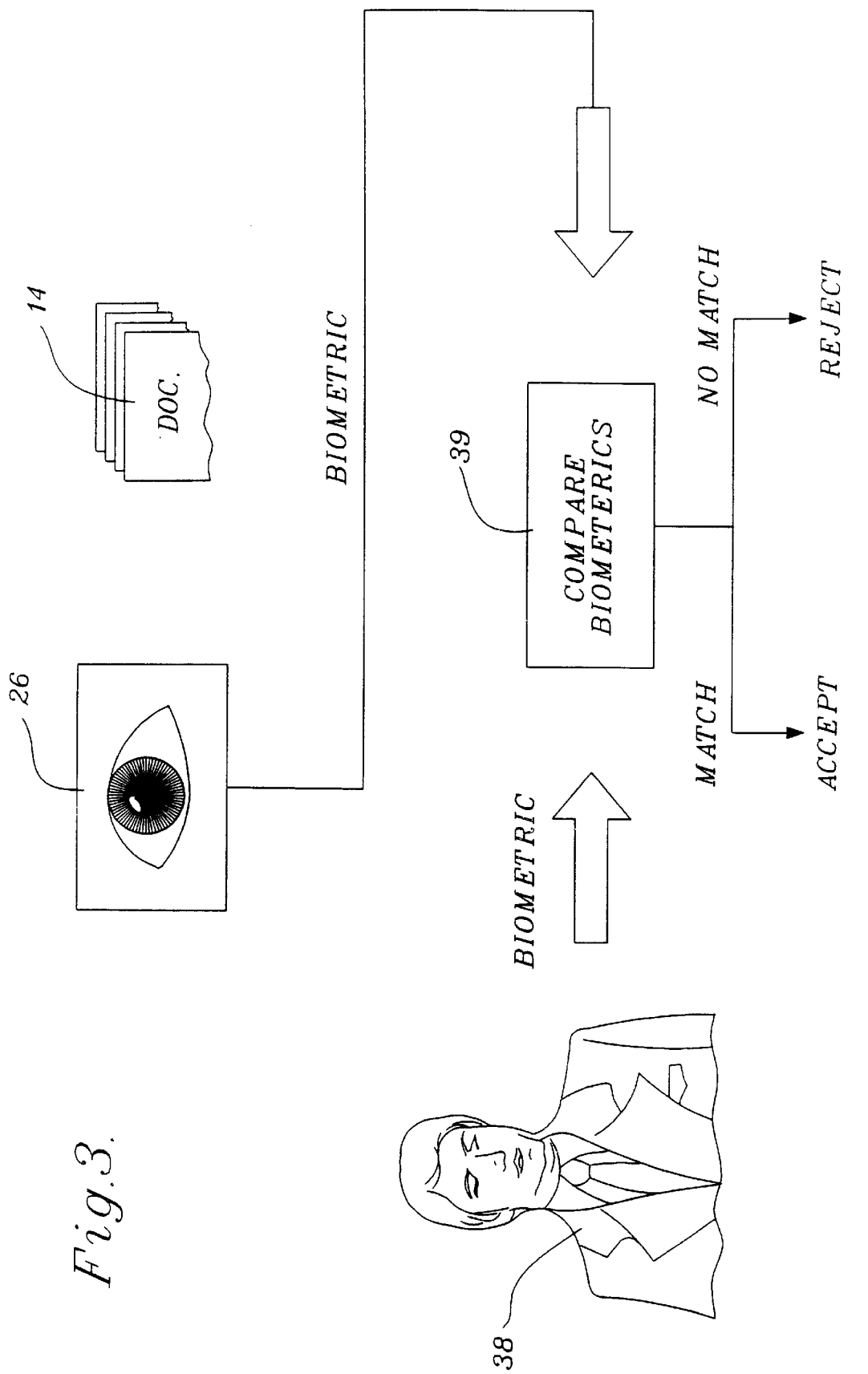
FIG. 3 is a schematic diagram of the process by which the identity of the signer of a document is verified.

To verify the identity of the signer of the document, the biometric data used to calculate signature 28 must be matched with a known sample from the signer in a match test indicated by block 37. This process is shown in FIG. 3. Signer 38 provides a sample of biometric data, or a sample known to have been taken from signer 38 is used. Biometric data 26, which has been proven to have been coupled with document 14 via the authentication process discussed above, is compared with the sample supplied by signer 38 via comparison process 39. One such comparison process is disclosed in the Daugman patent previously discussed. If a match is made between biometric data 26 and the sample provided by signer 38, the document is accepted as having been signed by signer 38.

It is worthwhile to note that the method disclosed herein does not necessarily require a secure camera to function. The camera and the security features in the camera increase the security of the system by making it difficult to substitute or alter the data gathered by the camera, or to fraudulently produce signatures of the biometric data. Therefore, the principle of the technique still holds even if the computations are performed on a less secure platform (e.g. a personal computer.) However, if a less secure system is used, substitution of data may be possible, this is not an inherent deficiency of the technique described in this patent but rather an implementation issue.

Furthermore, the technique is not limited to devices which gather visual information, and can be applied to devices which sample and process other types of data used for biometric purposes (such as a speech recording device or a fingerprint sensor). Therefore, the term "camera" as used herein may be construed as any device capable of gathering data used for biometric techniques.

Since the storage of a number of data items are required for this methodology, it is convenient to combine them into a single entity which can be simply stored and exchanged. Biometric data 26, and digital signature 28 are minimally required for the methodology. In addition, token 12, hash value 16, the public key of camera 22 (if an asymmetric signature algorithm is used), time/date stamps, transaction id, and other information may also be combined into this "entity" to be used as required by the particular authentication service being performed. These may be stored in a file concatenated together at some remote location, such as a central authority and retrieved as required from that remote location. This file may be thought of as a "biometric document signature certificate" that could be issued, exchanged, stored or transferred for other use. This "biometric document signature certificate" may be given a code which can be used at a later date to retrieve the information when authentication is performed. Furthermore the central authority may itself digitally sign the certificate to prove that it had processed the information. Those versed in the art can recognize multiple ways for the central authority to sign the certificate or otherwise provide additional proof of processing or security measures.

To summarize the process:

Document Signing:

Let H(x) be a hash function over digital data x, and let H(x,t) be a hash function over digital data x and one-time token t. The hash function for electronic document D is then defined as:

$h_D = H(D,t)$.

A secure camera can produce an iris quality image I, of a person, P, and a signature, s, computed with some digital signature function S which takes as inputs image I, token t', and secret camera key k. The digital signature function consists of a hash function H' (which may or may not use the same algorithm as used in H) and an encryption function E. Therefore:

$s = S(I,t',k)$, or $s = E(H'(I,t'),k)$.

Note that, as discussed previously, if the camera is capable of converting the image into a biometric template, the methodology may still be used to couple a document to the biometric template as opposed to an image. Thus 'I' may be thought to represent raw image data or a biometric template produced from the image inside of the camera or other biometric information obtained by any means.

Now, using the hash of the document $h_D$ as the token, t', to generate a signature for the document D and person P:

$S_{D,P} = S(I_P, h_D, k)$, or $S_{D,P} = E(H'(I_P, H(D,t)), k)$.

where $I_P$ is some particular image of some feature, or other biometric, of person P suitable for biometric verification, and $S_{D,P}$ is the corresponding signature computed in the secure envelope of the camera or other biometric acquisition device and output along with $I_P$.

Authentication:

To verify that person P signed document D, obtain the document in question, D', which is claimed to be the same document as D. Retrieve the one-time token t saved by a token server or provided via the biometric document signature certificate. Retrieve $S_{D,P}$ and $I_P$. Compute:

$h'_{D,P} = H'(I_P, H(D', t))$

Retrieve the secret camera key k, or if an asymmetric algorithm is used, obtain the public complement of k. Decrypt $S_{D,P}$ with $E^{-1}$ (the corresponding decryption algorithm to E, or the inverse function of E) and k to get the sent hash:

$h''_{D,P} = E^{-1}(S_{D,P}, k)$

If $h'_{D,P}$ matches $h''_{D,P}$ then neither the biometric data nor the document have been altered, and D has been bound to $I_P$ since $S_{D,P}$ could not have been computed without $h_D$.

Identity Verification:

Use any biometric methods known to those of ordinary skill in the art to determine that $I_P$ is truly of a identifying feature of person P; that is, $I_P$ verifies or can be used to verify the identity of P. Successful verification of a person to $I_P$ binds that person to the document, D. Three possibilities exist, the biometric data $I_P$ may be verified against a previously enrolled biometric data of the person P, the biometric data $I_P$ may be used as "enrollment" data and the actual person is verified against this data; finally, the actual person may supply new biometric data for enrollment and the data $I_P$ compared to this enrollment data. The verification of the document can occur at any point in time following the digital signing, so long as the unique token (if used), the original biometric data, and the signature remain stored, and the ability to retrieve a camera key is preserved.

Multiple signers can be supported with this methodology. If any individual can show their identity is bound to that document then they can be considered a signer of the document. In this case all signers are independent. Thus, in cases where there is a document D, and persons A and B wish to prove they have signed the document, $S_{D,A}$, $I_A$, $S_{D,B}$ and $I_B$ would all be required. However, proof that A signed D does not imply that B also signed D, nor is the converse true.

However in cases where an explicit relationship or dependency of multiple signers of a single document must be proven, a "chaining" may be accomplished by entering the signature of person A into the camera (as the input token) when the biometric data of person B is collected. Therefore, to authenticate B, unaltered versions of the biometric data of person A and document D would be required. This could support any number of signers. Those or ordinary skill in the art can come up with multiple variations based on this concept including support for multiple documents.

The following is one example scenario of the use of the technique with the Internet. Those schooled in the art may envision many other scenarios which may be realized using variations of the technique.

Figure 4:
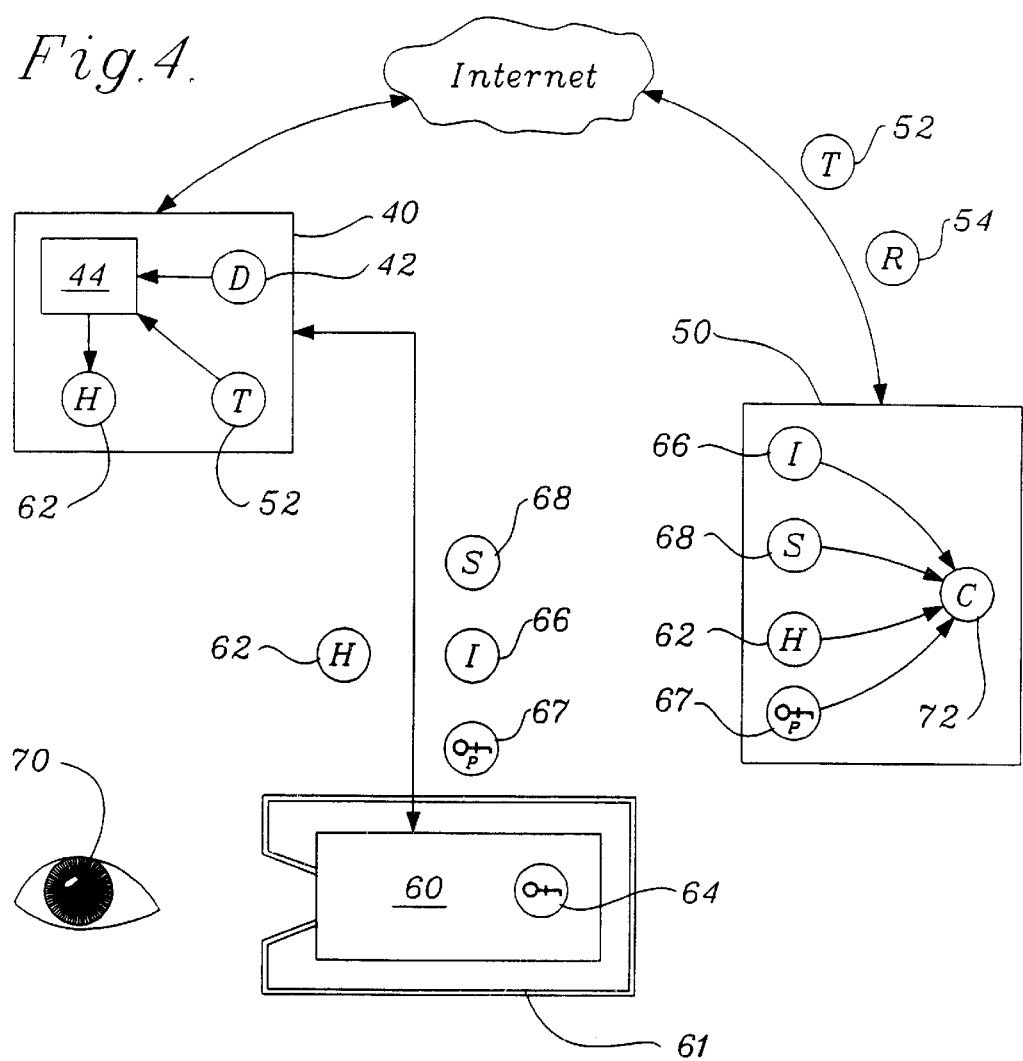
FIG. 4 is a block diagram of a present preferred apparatus used to sign an electronic document.

Example Signing Process:

With reference to FIG. 4, an individual has prepared a document 42 that must be electronically "notarized." He composes document 42 using his personal computer 40, and saves document 42 as a file on the computer's disk. When he desires to sign document 42, he invokes digital signature application 44 on personal computer 40 and directs the application to sign the file he had saved at some location. Application 44 contacts central server 50 via the Internet (or via any other means known in the art) to request a one-time unique token 52. Server 50 generates token 52, and returns it to personal computer 40. A hash algorithm in application 44 computes hash value 62 of document 42 and token 52. Hash value 62 is sent to secure camera 60, which is preferably enclosed within an optional tamper-proof enclosure indicated by box 61. Camera 60 is activated by receipt of hash value 62. Camera 60 produces image 66 of signer's iris 70, and generates digital signature 68 using key 64, image 66 and hash value 62. If camera 60 can produce iris templates, then the iris template may be returned as opposed to, or even in addition to, image 66.

Image 66 (or template), hash value 62, public key 67 of camera 60, and digital signature 68 are sent to central server 50, which stores the data along with token 52 previously generated by server 50 in the form of a "certificate" 72. Server 50 returns receipt code 54 which later can be used to locate the stored data.

Figure 5:
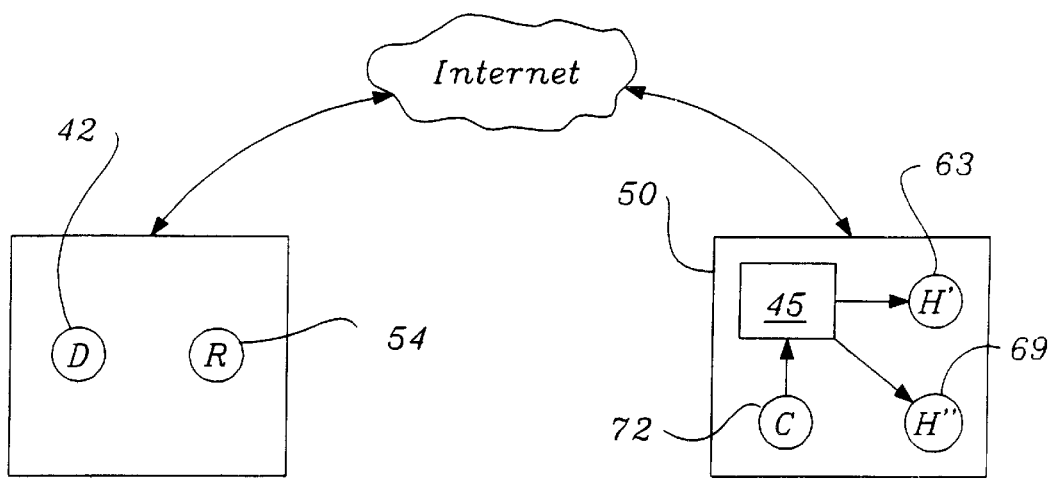
FIG. 5 is a block diagram of a present preferred apparatus used to authenticate a signed electronic document.

Example Authentication Process:

With reference to FIG. 5, at some time after the signature of the original document, an individual wishes to prove, for example to a court, that he had signed the document in question. The court may demand document 42 and receipt 54, stored on personal computer 40. Document 42 and receipt 54 are sent to a server 50 where the authentication is performed. Server 50 obtains receipt 54, and document 42 from the requester; in this case, a court. The server looks up certificate 72 based on receipt 54, and reads one-time token 52 stored therein, and computes hash value prime 63 of document 42 and token 52 using application 45. If the newly computed hash value prime 63 matches the stored hash value 62, the document is known to be unaltered. The server reads image 66 (or template) stored for the transaction in certificate 72, and computes hash double-prime 69. Hash double prime 69 is composed of the combination of hash of 63 and image 66. If hash double-prime 69 matches the decryption of signature 68 stored in certificate 72, image 66 (or template) has not been altered, and it is known that document 42 was bound to image 66.

A biometric match is performed with image 66 (or a template derived from the image) and another image belonging to the individual who claims to have signed the document. The court may demand the presence of the individual whereupon the individual is asked to provide an image or template for biometric matching, if the court does not accept previously storeded images or templates. This biometric match proves the identity of the signer and binds him to the document.

As defined in our preferred embodiment, the document and optional token are hashed together and then this result is combined with the biometric data and further hashed prior to encryption. Those skilled in the are will also recognize that other methods of combination are possible such as combining the document, token and biometric data together via concatenation and hashing the result.

Although I have shown and described certain present preferred embodiments of my method and apparatus for performing that method, it should be distinctly understood that the invention is not limited thereto but may be variously embodied within the scope of the following claims.

I claim:

1. A method of generating a digital signature for an electronic document comprising the steps of:
   a. applying a first hashing function to an electronic document to produce a hash value;
   b. acquiring biometric data from a plurality of signers of said electronic document;
   c. applying a second hashing function to the combination of the hash value of the electronic document and the acquired biometric data;
   d. generating a digital signature related to a first signer of said electronic document utilizing as input biometric data related to said first signer, the previous hash value of step c and a secret key; and
   e. generating digital signatures for subsequent signers of said electronic document utilizing as input the signature of a previous signer, biometric data related to the signer whose signature is being generated, and a secret key.

2. The method of claim 1 in which the digital signature is generated by an encrypting function having as input the hash output of step c and a secret key.

3. The method of claim 2 wherein the encrypting function is asymmetric.

4. The method of claim 1 further comprising the step of generating or acquiring a unique token and wherein said first hashing function is applied to a combination of said unique token and said electronic document.

5. The method of claim 4 wherein the token is associated with a time or date, or transaction identifier.

6. The method of claim 4 wherein said unique token and said electronic document are combined by concatenation.

7. The method of claim 1 wherein said biometric data is a biometric template derived from a larger set of biometric information.

8. The method of claim 1 where said key uniquely identified an input device from which said biometric data was acquired.

9. The method of claim 1 wherein said biometric data represents an image of the iris of one eye of a signer of said electronic document.

10. The method of claim 1 wherein said biometric data represents an image of iris of both eyes of a signer of said electronic documents.

11. The method of claim 1 wherein said digital signature and said biometric data are concatenated to form a biometric document signature certificate.

12. The method of claim 11 wherein said biometric document signature certificate also includes a unique token, said hash value and said key.

13. The method of claim 12 further comprising the step of sending said biometric document signature certificate to a central server, where it may be retrieved for authentication purposes.

14. The method of claim 13 further comprising the step of receiving a receipt code for retrieving said certificate from said central server at a later time.

15. The method of claim 13 further comprising the step of applying with the central server a digital signature to the certificate.

16. A method of using a digital signature of a previous signer to authenticate the association of an electronic document and a subsequent signer of said electronic document comprising the steps of:
   a. retrieving biometric data of the previous signer originally associated with said electronic document; and
   b. verifying the association between said biometric data of the previous signer and said electronic document by recomputing the digital signature of the previous signer, thereby authenticating the association of the electronic document and the subsequent signer.

17. The method of claim 16 further comprising the step of comparing said biometric data associated with said electronic document with a known sample from an alleged signer of said electronic document.

18. A method of using a digital signature of a previous signer to authenticate the association of an electronic document and a subsequent signer's biometric data comprising the steps of:

a. acquiring a key;

b. using said key to decrypt said digital signature of the subsequent signer;

c. retrieving original biometric data related to the previous signer of said electronic document;

d. applying a hashing function to said electronic document to produce a hash value;

e. generating a second hash value having as input said biometric data of the subsequent signer, and said hash value of step d; and f. comparing a result of step b with result of step e to verify that they match, thereby authenticating the association of the electronic document with the subsequent signer's biometric data.

19. The method of claim 18 further comprising the step of retrieving a transaction token, said token having been used in the generation of said digital signature, wherein said hashing function of step d is applied to a combination of said token and said electronic document.

20. The method of claim 19 wherein said token and said electronic document are combined by concatenation.

21. The method of claim 18 wherein said digital signature was created with an encrypting function which is asymmetric and wherein said key is the public complement of a private key used to encrypt said digital signature.

22. The method of claim 18 wherein said biometric data is a biometric template derived form a larger set of biometric information.

23. The method of claim 18 further comprising the step of comparing said biometric data to a known sample from a signer of said electronic document to verify the identity of the signer.

24. An apparatus for generating a digital signature of a previous signer of an electronic document to authenticate the association of the electronic document and a subsequent signer of said electronic document, comprising:

a. an input device for collecting biometric data of the previous signer, said input device having a secret key comprised of a data value;

b. an encoder, for applying a hash function to a combination of said electronic document and a unique token to produce a hash value; and c. a signature generator, coupled to said input device and said encoder, for generating said digital signature of the previous signer based on said biometric data, said hash value and said key, the digital signature of the previous signer being used to authenticate the association of the electronic document and the subsequent signer.

25. The apparatus of claim 24 wherein said input device is capable of converting said biometric data into a biometric template, and wherein said biometric template is thereafter used in place of said biometric data.

26. The apparatus of claim 24 wherein said input device is a video camera.

27. The apparatus of claim 26 further comprising a tamper-proof enclosure in which said video camera is located.

28. The apparatus of claim 27 wherein said camera is rendered non-functional if an attempt to gain access to said camera enclosure is detected.

29. The apparatus of claim 24 wherein said biometric data represents a scan of the iris of one or both eyes of the signer of said electronic document.

30. The apparatus of claim 24 wherein said unique token also serves as a timestamp.

31. The apparatus of claim 24 wherein said unique token is retrieved from a token generator.

32. The apparatus of claim 31 wherein said token generator is accessible via a network.

33. The apparatus of claim 24 wherein said key uniquely identifies said input device.

34. The apparatus of claim 24 wherein said unique token and said electronic document are combined by concatenation.

* * * * *